United States Patent
Lühmann et al.

(12) 
(10) Patent No.: US 6,737,135 B1
(45) Date of Patent: *May 18, 2004

(54) REDETACHABLE, SELF-ADHESIVE DEVICE

(75) Inventors: Bernd Lühmann, Norderstedt (DE); Andreas Junghans, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,591

(22) Filed: Feb. 25, 2000

Related U.S. Application Data

(62) Division of application No. 08/927,754, filed on Sep. 11, 1997, now Pat. No. 6,136,397.

(30) Foreign Application Priority Data

Sep. 13, 1996 (DE) .......................... 196 37 222
Jul. 11, 1997 (DE) .......................... 197 29 706

(51) Int. Cl.[7] .................................................. C09J 7/02
(52) U.S. Cl. .............. 428/40.1; 248/205.3; 248/467; 248/558; 248/683; 428/41.8; 428/42.1; 428/192; 428/194
(58) Field of Search .................. 428/40.1, 192, 428/194, 42.1, 41.8; 248/683, 538, 205.3, 467

(56) References Cited

U.S. PATENT DOCUMENTS

| | | | |
|---|---|---|---|
| 5,516,581 A | * | 5/1996 | Kreckel .................... 428/317.3 |
| 5,672,402 A | | 9/1997 | Kreckel ....................... 428/343 |
| 6,136,397 A | * | 10/2000 | Luhmann .................... 428/40.1 |

FOREIGN PATENT DOCUMENTS

| | | |
|---|---|---|
| WO | WO 92/11333 | 7/1992 |
| WO | WO 99/63018 | 12/1999 |

* cited by examiner

Primary Examiner—Nasser Ahmad
(74) Attorney, Agent, or Firm—Norris McLaughlin & Marcus

(57) ABSTRACT

Redetachable, self-adhesive device having a plate, the sides and/or front side of which have fastening means, if appropriate, and the rear side of which has a strip of an adhesive film which is adhesive on both sides and is adhesively attached in such a way that one end of the adhesive film protrudes beyond the plate as a grip, the adhesive film being of such a kind that the adhesive bond achieved with it can be released again by pulling, stretching the strip, characterized in that the plate (1) has at its end, or on its rear side (2) at least in the region (3A, 3B) which bears against the grip (6) of the adhesive film strip (5), low stick and slip friction with respect to the adhesive film strip (5).

50 Claims, 1 Drawing Sheet

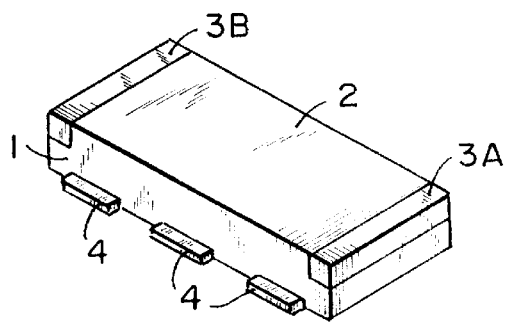
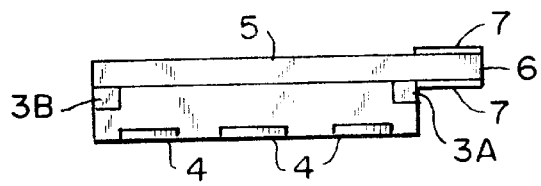
FIG.1     FIG.2
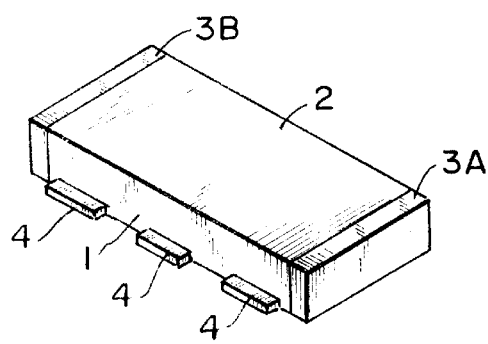
FIG.3
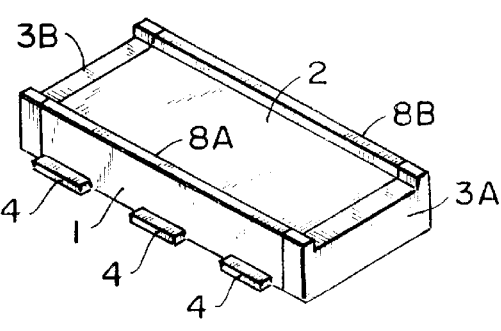
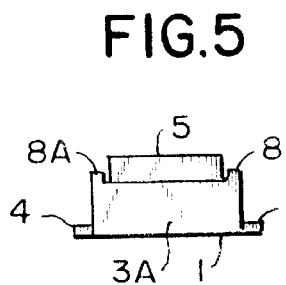
FIG.4     FIG.5

REDETACHABLE, SELF-ADHESIVE DEVICE

This application is a divisional of U.S. Ser. No. 08/927,754, filed Sep. 11, 1997, now allowed U.S. Pat. No. 6,136,397.

BACKGROUND OF THE INVENTION

1. Field of the Invention

The invention relates to a redetachable, self-adhesive device which can be released again from its adhesive bond without leaving any residue by pulling on the adhesive film arranged on it.

2. Description of Related Art

Such devices, in particular hooks, are known. For instance, DE 42 33 872 C2 describes a redetachable, self-adhesive hook which is equipped with an adhesive film which can be adhesively released by pulling and which is commercially available as "tesa® Power-Strips with Hooks". A so-called system hook with base plate and attachable decorative hook is also commercially available as the "tesa® Power-Strip System Hook".

WO 94/21157 also discloses such a hook, which differs from the abovementioned hook in particular by the use of an adhesive film of the kind which is highly extensible and at the same time does not recover its original form.

In the practical use of such devices, problems may occur, however, in particular during later detachment. This is so since a re-releasable adhesive bond is achieved in all the abovementioned cases by a stretching of the self-adhesive tape used for the adhesive bonding and provided on one or both sides with a contact adhesive. For this purpose, starting from a grip, the adhesive tape is pulled in the direction of the grip substantially parallel to the bonding plane. The extension of the adhesive tape which is produced causes it to be released from the underlying surface without leaving any residue. WO 92/11332, WO 92/11333, WO 94/21157 and WO 95/06691 specify as the maximum pulling-off angle for redetachment without leaving any residue an angle of 35° between the bonding plane and the extending direction. In addition to high extensibility, a low offset yield stress in the case of low to moderate extensions combined with an adequately high tearing resistance in the case of high extensions are important for releasing the adhesive tape from an adhesive joint completely and without leaving any residue. For a reliable detachment process, the tearing resistance must in this case be well above the force which is necessary for releasing the adhesive tape from the adhesive joint (stripping force). If the stripping force is greater than the tearing resistance of the adhesive tape, the adhesive tape tears during the releasing process.

Interesting applications of previously described self-adhesive tapes comprise, inter alia, use in adhesive hooks, such as are frequently used domestically in bathrooms and kitchens (see DE 42 33 872, WO 94/21157, U.S. Pat. No. 5,507,464) or else specific adapter systems. Commercially available in this respect are, inter alia, adhesive hooks of modular construction (tesa Power-Strips System Hooks), comprising a base plate to which the hook body is adapted. Corresponding base plates thereby allow mouldings of the widest variety of formations to be adapted, permitting a wide range of variations of applications. Examples comprise adapters for the fixing of cables, mirrors, pictures etc.

What is disadvantageous about the previously known problem solutions is that the releasing of the adhesive bond has to take place by pulling the adhesive strips substantially in the bonding plane. Errors in use are consequently inevitable for the inexperienced user. If the adhesive tape is pulled off at a significant angle with respect to the bonding plane or even perpendicularly forwards, the additionally occurring frictional forces and the additional contact pressure between the adhesive tape and the object to which it is adhesively bonded, or the base plate used, may cause tearing of the adhesive tape in the region of the pulling-off edge of the adhesive film. The tearing resistance relevant here is not identical to that determined in accordance with DIN 53504 in the tearing force/ultimate elongation experiment. Rather, owing to the pulling out of the adhesive films from the adhesive joint at an angle other than 0°, it is at usually considerably lower values. Increasing the tearing resistances of the adhesive tapes used is one possible way of reducing the tendency to tear. However, a corresponding measure is often only possible to a limited extent, since it (for example the use of thicker self-adhesive tapes or more tear-resistant intermediate substrates) cannot be carried out selectively without adversely influencing other product properties, such as for example the extensibility.

Tearing of the adhesive tape may likewise occur if the stretching of the adhesive tape is performed, as intended, substantially in the plane of the adhesive bond and in the direction of the grip. In many case it has been found that tears are caused in this case by the user exerting very considerable force to press the item to be released perpendicularly against the object to which it is adhesively bonded during the releasing process. As a result of this also, the force necessary for pulling the adhesive tape out of the adhesive joint is increased to such a great extent that the tearing resistance is exceeded, with the unfortunate consequence for the user that the adhesive tape tears and the adhesive bond can no longer be released non-destructively and without leaving any residue.

And finally there are many applications in which, for reasons of spatial limits, pulling in the direction of the bonding plane is not possible, for instance because the adhesive bonding was performed in a depression or in a corner.

The object of the present invention was to overcome the aforementioned disadvantages.

This is achieved according to the invention by a device such as that described in more detail in the patent claims.

SUMMARY OF THE INVENTION

Thus, the invention relates to a redetachable, self-adhesive device having a plate, the sides and/or front side of which have fastening means, if appropriate, and the rear side of which has a strip of an adhesive film which is adhesive on both sides and is adhesively attached in such a way that one of the adhesive film protrudes beyond the plate as a grip, the adhesive film being of such a kind that the adhesive bond achieved with it can be released again by pulling, stretching the strip, characterized in that the plate (1) has at its end, or on its rear side (2) at least in the region (3A, 3B) which bears against the grip (6) of the adhesive film strip (5), low stick and slip friction with respect to the adhesive film strip (5).

Preferred in this case is a device in which the stripping force at a pulling-off angle of 60° is no more than three times, preferably two times, the stripping force at the pulling-off angle of 0°.

Particularly preferred in this case is a device in which the stripping force at a pulling-off angle of 90° is no more than three times, preferably two times, the stripping force at the pulling-off angle of 0°.

Preferred is, furthermore, a device in which the region (3A, 3B) which bears against the grip (6) allows moreover with respect to the adhesive film strip a stripping force at a pulling-off angle of 60° which is three times the stripping force at the pulling-off angle of 0°, preferably two times the stripping force at the pulling-off angle of 0°.

Particularly preferred is, furthermore, a device in which the region (3A, 3B) which bears against the grip (6) allows moreover with respect to the adhesive film strip a stripping force at a pulling-off angle of 90° which is three times the stripping force at the pulling-off angle of 0°, preferably two times the stripping force at the pulling-off angle of 0°.

Preferred is, furthermore, a device in which the region (3A, 3B) which bears against the grip (6) has a low-energy surface, based on fluorine-containing polymers, organo-silicon polymers, polyolefins or based on polymers which contain fluorine-containing segments, segments of organo-silicon polymers or polyolefin segments or those based on a mixture of the aforementioned polymers, if appropriate with further polymers.

Preferred is, furthermore, a device in which the region (3A, 3B) which bears against the grip (6) has a surface tension of up to 37 mN/m.

Preferred is, furthermore, a device in which the region (3A, 3B) which bears against the grip (6) is formed together with the plate (1) as an integrated injection-moulded part of plastic.

Preferred is, furthermore, a device in which the adhesive film, with or without an intermediate substrate, is elastically or plastically extensible.

Preferred is, furthermore, a device in which the adhesion of the adhesive film is less than the cohesion, the adhesiveness is to a great extent dissipated when the film is extended, and the ratio of pulling-off force to tearing load is at least 1:2.0, in particular 1:3.0, the adhesive film being of the kind which is based on thermoplastic rubber and tackifying resins, with high elasticity and low plasticity.

Preferred is, furthermore, a device in which the rear side of the adhesive film (5) is covered with a release laminate, such as a siliconized release paper or a release film.

Preferred is, furthermore, a device in which there is a hook on the front side of the plate (1).

Preferred is, furthermore, a device in which the plate (1) has on its rear side (2) laterally alongside the adhesively attached adhesive film strip (5) spacers (8A, 8B), the height of which is less than the thickness of the adhesive film strip (5).

Preferred is, furthermore, a device in which the spacers (8A, 8B) are located on both sides alongside the adhesively attached adhesive film strip (5).

Preferred is, furthermore, a device in which the spacers (8A, 8B) are formed as fillets or segments.

Preferred is, furthermore, a device in which the spacers (8A, 8B) are formed together with the plate (1) as an injection-moulded part.

Preferred is, furthermore, a device in which the height of the spacers (8A, 8B) is 30–90% of the thickness of the adhesively attached adhesive film strip (5), in particular is 0.3–0.6 mm with a thickness of the adhesive film strip (5) of 0.65 mm.

Moreover, the invention relates to the use of a plate for such a device for redetachable, self-adhesive fastening and releasing again by pulling on the grip of the strip at an angle approximately perpendicular to the bonding plane, in particular at such an angle of 45°–135° with respect to the bonding plane.

The height of the spacers is advantageously chosen such that it is less than the thickness of the adhesive film (unstretched), so that a satisfactory adhesive bond with the adherent surface is possible. The extension of the adhesive film occurring during the detachment operation causes the said film to be reduced correspondingly in width and thickness. If the thickness of the adhesive film reached during detachment is less than the height of the spacers, detachment of the adhesive film without tearing is even possible if high contact pressures occur at the same time vertically to the adhesive bond, which would otherwise have lead to tearing of the adhesive tape.

The use of plates which, on the grip side, in the edge region of the adhesive bond, contain a material which has a lowest possible coefficient of stick friction and a low coefficient of slip friction with respect to the adhesive film respectively used make it possible for the adhesive bond to be released without leaving any residue even if the angle between the bonding plane and the pulling-off direction is significantly greater than 0°, in particular about 45–135°, in particular 60–100°.

Particularly advantageous in this case is a combination of these elements, in other words a plate with a region of low stick and slip friction at the end over which the adhesive film strip is to be pulled, and provided with spacers to the sides of the adhesively attached adhesive film strip in order to permit easy, non-tearing pulling off of the adhesive film strip even when excessive pressing force is being applied to the plate during the said pulling off.

Since the user of a plate according to the invention possibly does not realize over which of its ends he is to place the adhesive film strip with its grip protruding, in order to pull it off later over this edge, such a region is advantageously provided at both ends of the plate. In the case of such a symmetrical design, the user does not have to concern himself in this respect.

A further advantageous possibility is for a plate according to the invention which has merely one edge region with low stick and slip friction to be designed in such a way that the same region can easily be differentiated visually by its optical appearance, for instance its colour, from the edge lying opposite it, which does not have a correspondingly low stick and slip friction.

According to the invention, suitable in particular as adhesive films are those corresponding to DE 33 31 016, DE 42 22 849, DE 42 33 872, WO 92/11333 and WO 94/21157.

For instance, DE 33 31 016 A1 describes an adhesive film for re-releasable adhesive bonds which allows an adhesive bond established therewith to be releasable by pulling on the adhesive film in the direction of the bonding plane. With such adhesive films, high adhesive forces and shear strengths can be achieved and adhesive bonds can be released again without further aids, in a way comparable to the opening of a preserving jar, similar to the way in which there the rubber seal is pulled by the grip out of the seal joint.

DE 42 22 849 C1 describes such an adhesive film with a UV-impermeable grip.

WO 92/11333 also describes, inter alia, adhesive films for corresponding applications, the adhesive films used having a low elasticity with at the same time high extension.

Double-sided self-adhesive tapes with a foam intermediate substrate, for example of polyethylene foam, can also be used according to the invention.

In general, for production, processing and handling of the particularly preferred adhesive films, reference is made to DE 33 31 016, DE 42 22 849 and WO 92/11333.

Suitable as the material for the plate or moulding, in particular as base plates, are plastic, metal, wood (coated, for example painted, and uncoated), ceramic and the like. In particular, the plate itself may be formed from a material which has a low stick and slip friction with respect to the adhesive films used.

Reduction of Stick and Slip Friction and Adhesive Interactions between the (base) Plate and Adhesive Film During the Redetachment Process Mouldings or (base) plates according to the invention serve for receiving one side of the adhesive film, the other side of which is adhesively bonded onto the selected underlying surface. A wide variety of adapters, including hook bodies, can be placed onto the base plate. The plate may, however, also be designed itself as a hook or the like, in other words have for example a hook-like holding device on its front side. To produce a high bonding strength, the surface of the base plate on the side to which the adhesive film is applied consists in particular of a material which has an adhesion with respect to the adhesive film which is adequate for the respective application. When using contact adhesives based on styrene block copolymers or acrylate copolymers, advantageously used in this case are, in particular, polystyrene, impact-modified poly-styrenes, PMMA, aromatic polyesters, polycarbonate or polyamides, including aromatic-containing polyamides. Base plates according to the invention are modified at at least one edge (over which the detachment process later takes place) in such a way that the edge region consists of a material which has low stick and slip friction coefficients with respect to the adhesive film used, which generally corresponds to a low adhesion of the adhesive films to this region. The friction coefficients are in this case to be set such that, under the given test conditions, the sum of the stripping force and frictional force is lower than the tearing force of the adhesive films used even at pulling-off angles significantly above 0° from the underlying surface. An adequate reduction of the frictional forces is achieved, for example, by the edge region of the base plate being formed by a low-energy plastic surface. Suitable materials which can be used are, inter alia, fluorine-containing polymers, in particular perfluorinated polymers, for example poly(tetrafluoroethylene), organo-silicon polymers, for example poly(dimethylsiloxane), polyolefins, for example poly(ethylene), in particular high-density poly(ethylene), which have in particular surface tensions of $\leq$ about 37 mN/m.

Suitable with preference are strong materials which deform little during the detachment process. In addition to the polymers mentioned above, suitable are those polymers which contain fluorine-containing segments, segments of organo-silicon polymers or poly-olefin segments. Furthermore, mixtures of the aforementioned polymers and blends of the aforementioned polymers with further polymers may also be used.

In the case of injection-moulded articles, providing one edge of the base plate with one of the aforementioned materials can take place by taking corresponding steps during the injection moulding of plastic bodies (use of a plurality of polymers in the injection-moulding process; 2-component injection). Another possibility is the subsequent application of a plastic in the form of a suitable moulded part in the edge region of the base plate. A further possibility is offered by the subsequent coating of base plates in the edge region by means of one of the polymers mentioned above. Coating possibilities comprise coating from solution, dispersion or as a 100% system from the melt. Optionally, the coated materials may be subjected to subsequent crosslinking.

Conversely, a plastic which has low friction coefficients or low adhesion with respect to the adhesive films used may be chosen as the base plate material itself. If need be, the corresponding base plate may be designed or treated in such a way that high adhesion with respect to the adhesive film, and consequently high adhesive forces, shear strengths and traction-adhesive strengths, are made possible in the bonding region of the adhesive film, but not in the edge region over which the detachment of the adhesive film takes place. Corresponding pretreatment methods may be, for example, flame treatment, corona and plasma treatment, gas-phase fluorination or else a wet-chemical pre-treatment method. Optionally, treatment of the surface with a primer is additionally possible.

According to the invention, a low friction coefficient between the adhesive film and the edge of the base plate can also be achieved by incorporating a rotatable roller or fitting a plurality of rotatable balls in a row into the end of the base plate (utilizing the rolling friction). However, corresponding solutions generally appear to be more complicated, and consequently economically of less interest, than the method described above.

Improving the Detachability by Spacers Integrated into the Base Plate (into the Moulding)

To accomplish a pulling-off behaviour without tearing, even under the effect of high forces acting perpendicularly with respect to the bonding plane (for example caused by high contact pressure when releasing the adhesive bond), the moulding or the base plate is preferably equipped with spacers (for example fillets) on the side which bears the adhesive film. Spacers may be provided on both sides alongside the adhesive film over the entire length of the base plate, or else only in certain subregions thereof. Specific formations, right-angled fillet-like, rounded-off fillet-like, punctiform etc., are possible.

Tests with different redetachable adhesive films show that, depending on the type and structure of the adhesive films used, typical stripping extensions lie between 100% and 800%. In practice, it is found that, in the case of substantially rubber-elastic adhesive films, the height of the spacers should be at least about 0.05 mm, preferably 0.10 mm, higher than the thickness of the stretched adhesive films during the detachment process. For a reliable adhesive bond, on the other hand, the spacer height should be kept about 0.05 mm, preferably 0.1 mm, particularly preferably 0.15 mm less than the thickness of the adhesive films in the non-stretched state. The values specified relate to planar solid adherent surfaces. In the case of rough and/or easily deformable adherent surfaces, values higher than those quoted may be advisable both for a satisfactory bonding process (adequate contact pressure) and for satisfactory redetachment.

BRIEF DESCRIPTION OF THE DRAWINGS

The invention is to be explained below with reference to examples and figures, without however wishing to restrict it unnecessarily.

In the drawing:

FIG. 1 shows an obliquely lateral view of a plate according to the invention,

FIG. 2 shows a side view according to FIG. 1, with an adhesively attached adhesive film strip, FIG. 3 shows an obliquely lateral view of a further plate, FIG. 4 shows an obliquely lateral view of yet another further plate, and FIG. 5 shows a front view of a plate according to FIG. 4.

DETAILED DESCRIPTION

To be specific, FIG. 1 shows a plate (1) with laterally arranged engagement devices (4) which can engage in corresponding engagement devices of a part to be attached, for instance a hook or the like, as is commercially available as the system hook for "tesa® Power-Strips". The rear side (2) of the plate (1) serves for adhesively attaching the adhesive film strip (5) (FIG. 2), the regions (3A) and (3B) of this rear side (2) which bear against the grip (6) of the adhesive film strip (5) consisting of a material of lower stick and slip friction with respect to numerous contact adhesives, in this case of high-density polyethylene. Since the user can stick the adhesive film strip (5) onto the plate (1) in such a way that the grip (6) can protrude both at one end and at the other end, both regions (3A) and (3B) are designed such that these regions have low stick and slip friction or adhesion with respect to the adhesive films used.

FIG. 2 shows the plate (1) with an adhesively attached adhesive film strip (2), the grip (6) of which is covered non-adhesively with thin films (7).

In FIG. 3, a different embodiment is shown, in which the plate (1) exhibits a rear side (2) which serves for receiving an adhesive film strip (not shown) and which has at both ends regions (3A) and (3B) which consist of high-density polyethylene. The plate (1) also has engagement devices (4), as according to FIG. 1.

FIG. 4 shows a further preferred embodiment of a plate (1) with a rear side (2) which serves for receiving an adhesive film strip (not shown) and which is provided, in a way corresponding to FIG. 3, with regions (3A) and (3B) of high-density polyethylene and also engagement devices (4). In addition, the plate (1) has, however, on both sides of the rear side (2) spacers (8A) and (8B), formed as fillets, the height of which is about half the thickness of the adhesive film strip to be applied, the spacing of the spacers (8A) and (8B) being chosen such that the adhesive film strip can easily be placed widthwise in between, as shown in the front view according to FIG. 5, with the plate (1) and region (3A) at the end face, engagement devices (4) and spacers (8A) and (8B), and also an adhesive film strip (5) placed in between.

EXAMPLE 1

Adhesive films described in Example 2 are applied to spacerless base plates of the dimensions 3 mm×40 mm×20 mm consisting of polyethylene (PE 300; from Arthur Krüger), Styroblend KR 2776 (BASF), polystyrene (Vestyron 214; Chemische Werke Hüls) and steel, and then the test pieces thus obtained are fixed on a planar underlying steel surface. The preparation of the test pieces corresponds to that of Example 2. For redetachment, the base plates are held on the underlying steel surface by a test person using his thumb and fingers on the side on which the grip protrudes, as far as possible without applying pressure, after which the adhesive film strips are slowly pulled out from the adhesive joint at different angles. The separation rate is about 1000 mm/min. It is tested whether the adhesive films can be released from the adhesive joint without tearing.

| Base plate material | Surface tension* in mN/m | Can be detached without tearing/stripping force in N/cm at a pulling-off angle of | | | |
|---|---|---|---|---|---|
| | | about 5° | 30° | 60° | 90° |
| Polyethylene | <34 | yes/9 | yes/12 | yes/14 | yes/15 |
| Styroblend KR 2776 | about 36 | yes/9 | yes/12 | yes/15 | yes/21 |
| Polystyrene | about 38 | yes/10 | no/>25 | no/>25 | no/>25 |
| Steel | — | yes/10 | yes/17 | yes/23 | no/>25 |

*corresponding to DIN 53364

If polyethylene and Styroblend KR 2776 are used as the base plate material, redetachment of the base plates without tearing is possible in the case of all the pulling-off angles tested here.

EXAMPLE 2

For a single-layer adhesive film of the following formulation:

50 parts of Foralyn 110 (Hercules), 50 parts of Vector 4211 (Exxon Chemical), 0.5 parts of Irganox 1010 (Ciba)

of a thickness of 650 μm, a maximum tensile force of 52 N/cm, corresponding to 8.0 MPa, and an ultimate elongation of 1300% are determined.

Rectangular pieces of the adhesive film measuring 20 mm×50 mm are adhesively bonded centrally to base plates consisting of steel of the dimensions 3 mm×40 mm×22 mm (height×length×width) in such a way that the base plates are covered on one side over their entire length with the adhesive film and a 10 mm long strip of adhesive film protrudes beyond one of the short sides of the base plates, which can be used as a grip for later detachment. The base plates are provided on both longitudinal edges on the side to which the adhesive films are applied with spacers 0.5 mm wide and of different heights. The base plates provided with adhesive films are adhesively bonded onto a planar underlying surface of Resopal. For this purpose, the base plates provided with the adhesive films are applied flatly to the underlying Resopal surface and are pressed onto it with 500 N for 5 seconds. In a second operation, for detaching the adhesive films, the test pieces fixed in this way are subjected to a force of likewise 500 N, acting vertically onto the bonding plane, and then the adhesive film strip is pulled out of the adhesive joint at an angle of <10° with respect to the bonding plane. For comparison, the tests are carried out without any force acting vertically on the bonding plane. The stripping rate in all the tests is about 1000 mm/min. The following results are obtained:

| Height of the spacers | Vertical pressing force 500 N | Without vertical force |
|---|---|---|
| No spacer | Strip tears | Can be detached without tearing |
| 0.3 mm | Can be detached without tearing | Can be detached without tearing |
| Stripping force* | 10//14 N/cm | |
| 0.4 mm | Can he detached without tearing | Can be detached without tearing |
| Stripping force* | 9//15 N/cm | |
| 0.5 mm | Can be detached without tearing | Can be detached without tearing |
| Stripping force* | 9//10 N/cm | |

-continued

| Height of the spacers | Vertical pressing force 500 N | Without vertical force |
|---|---|---|
| 0.6 mm | Can be detached without tearing | Can be detached without tearing |
| Stripping force* | 9//10 N/cm | |
| 0.7 mm | No adhesive bonding possible | No adhesive bonding possible |

*Mean value//maximum value (the maximum value is reached at the end of the stripping operation).

Under the chosen test conditions, only base plates provided with spacers can be detached again without tearing under the effect of high vertical forces acting on the base plate.

EXAMPLE 3

Base plates corresponding to Example 1, with a spacer height of 0.5 mm, are modified in such a way that a rectangular metal piece 1 mm deep and of the same width is milled out at the edge over which the adhesive films are detached. A piece of plastic, of PTFE, polyethylene (PE 300; from Arthur Krüger), Styroblend KR 2776 (BASF), polyamide (Ertalon 6 SA, from Arthur Krüger), measuring 0.7 mm×1 mm×20 mm (height×width×depth), or a siliconized release paper (Natrosil 20 291; Schleipen & Erkens), measuring 0.12 mm×1.5 mm×20 mm (height×width×length), is adhesively fixed in the depression. The following preparation of the test pieces corresponds to that of Example 1. In a way corresponding to Example 2, it is tested whether the adhesive films can be pulled out of the adhesive joint without tearing. However, during the releasing operation, the base plate is not kept in a stress-free state, but instead, as in Example 1, a force of 500 N is applied to the test pieces vertically onto the bonding plane.

| Base plate material | Surface tension* in mN/m | Can be detached without tearing/stripping force in N/cm at a pulling-off angle of | | | |
|---|---|---|---|---|---|
| | | about 5° | 30° | 60° | 90° |
| PTFE | <30 | yes/9 | yes/10 | yes/11 | yes/12 |
| Polyethylene | <34 | yes/9 | yes/11 | yes/13 | yes/15 |
| styroblend KR 2776 | about 36 | yes/9 | yes/12 | yes/14 | yes/20 |
| Polyamide | about 42 | yes/9 | yes/12 | yes/16 | no/>20 |
| Siliconized release paper | <30 | yes/9 | yes/15 | yes/18 | yes/23 |
| Steel | — | yes/9 | yes/15 | yes/20 | no/>25 |
| For comparison: Base plate edge material base plate core material = polystyrene | | | | | |
| Polystyrene | about 38 | yes/10 | no/>25 | no/>25 | no/>25 |

If materials with low-energy surfaces are used, pulling out from the adhesive joint without tearing is possible in the entire range of pulling-off angles under consideration.

What is claimed is:

1. A releasible, self-adhesive device comprising:
   a) a plate having a front, rear and four sides;
   b) a double-sided adhesive strip of film adhered to the rear of said plate through an adhesive bond in such a way that one end of said adhesive film strip protrudes from said plate as grip; and
   c) optionally one or more fasteners protruding from the sides or front of said plate for fastening said plate to another device; wherein the adhesive bond between said adhesive film strip and said plate can be released by pulling and stretching the adhesive film strip; and the plate has at its end which bears against the grip of said adhesive film strip or on its rear at least in a region which bears against the grip of said adhesive film strip, a plastic surface having a coefficient of friction or adhesion low enough that the adhesive film strip does not tear when the adhesive bond between the adhesive film strip and the plate is released by pulling and stretching the adhesive film strip.

2. Device according to claim 1, wherein the stripping force at a pulling-off angle of 60° is no more than three times.

3. Device according to claim 1, wherein the stripping force at a pulling-off angle of 90° is no more than three times.

4. Device according to claim 1, wherein the region which bears against the grip allows with respect to the adhesive film strip a stripping force at a pulling-off angle of 60° which is three times the stripping force at the pulling-off angle of 0°.

5. Device according to claim 1, wherein the region which bears against the grip allows with respect to the adhesive film strip a stripping force at a pulling-off angle of 0°.

6. Device according to claim 1, wherein the region which bears against the grip has a surface tension of up to 37 mN/m.

7. Device according to claim 1, wherein the region which bears against the grip is formed together with the plate as an integrated injection-moulded part of plastic.

8. Device according to claim 1, wherein the adhesive film, with or without an intermediate substrate, is elastically or plastically extensible.

9. Device according to claim 1, wherein the adhesion of the adhesive film strip is less than the cohesion, the adhesion is to a great extent dissipated when the film is extended, and the ratio of pulling-off force to tearing load is at least 1:2.0, the adhesive film strip being of the kind which is based on thermoplastic rubber and tackifying resins.

10. Device according to claim 1, wherein the rear side of the adhesive film strip is covered with a release laminate.

11. Device according to claim 1, wherein there is a hook on the front side of the plate.

12. Device according to claim 1, wherein the plate has on its rear side laterally alongside the adhesively attached adhesive film strip spacers, the height of which is less than the thickness of the adhesive film strip (5).

13. Device according to claim 12, wherein the spacers are located on both sides alongside the adhesively attached adhesive film strip.

14. Device according to claim 12, wherein the spacers are formed as fillets or segments.

15. Device according to claim 12, wherein the spacers are formed together with the plate as an injection-moulded part.

16. Device according to claim 12, wherein the height of the spacers is 30–90% of the thickness of the adhesively attached adhesive film strip.

17. Device according to claim 2, wherein the stripping force at a pulling-off angle of 60° is no more than two times the stripping force at a peeling-off angle of 0°.

18. Device according to claim 3, wherein the stripping force at a pulling-off angle of 90° is no more than two times the stripping force at a peeling-off angle of 0°.

19. Device according to claim 4, wherein the region which bears against the grip allows with respect to the adhesive film strip a stripping force at a pulling-off angle of 60° which is two times the stripping force at the pulling-off angle 0°.

20. Device according to claim 5, wherein the region which bears against the grip allows with respect to the adhesive film strip a stripping force at a pulling-off angle of 90° which is two times the stripping force at the pulling-off angle 0°.

21. Device according to claim 10, wherein the release laminate is a siliconized release paper on a release film.

22. Device according to claim 16, wherein the height of the spacers is 0.3–0.6 mm and the thickness of the adhesive film strip is 0.65 mm.

23. A method of forming a temporary bond between a substrate and a device according to any one of the claims 1–22, said method comprising adhering said device to said substrate by means an adhesive bond formed between said substrate and said adhesive film strip, and thereafter releasing said device from said substrate by pulling on the grip of said adhesive film strip at an angle approximately perpendicular to the plane of the bond formed between said substrate and said adhesive film strip.

24. The method according to claim 23, wherein said device is released from said substrate by pulling on the grip of said adhesive film strip at an angle of 45°–135° relative to said bond plane.

25. A releasible, self-adhesive device comprising:
a) a plate having a front, rear and four sides;
b) a double-sided adhesive strip of film adhered to the rear of said plate through an adhesive bond in such a way that one end of said adhesive film strip protrudes from said plate as grip; and
c) optionally one or more fasteners protruding from the sides or front of said plate for fastening said plate to another device; wherein
the adhesive bond between said adhesive film strip and said plate can be released by pulling and stretching the adhesive film strip; and
the plate has at its end which bears against the grip of said adhesive film strip, a roller or a row of balls.

26. Device according to claim 25, wherein the stripping force at a pulling-off angle of 60° is no more than three times.

27. Device according to claim 25, wherein the stripping force at a pulling-off angle of 90° is no more than three times.

28. Device according to claim 25, wherein the region which bears against the grip allows with respect to the adhesive film strip a striping force at a pulling-off angle of 60° which is three times the stripping force at the pulling-off angle of 0°.

29. Device according to claim 25, wherein the region which bears against the grip allows with respect to the adhesive film strip a stripping fore at a pulling-off angle of 0°.

30. Device according to claim 25, wherein the region which bears against the grip has a surface tension of up to 37 mN/m.

31. Device according to claim 25, wherein the region which bears against the grip is formed together with the plate as an integrated injection-moulded part of plastic.

32. Device according to claim 25, wherein the adhesive film, with or without an intermediate substrate, is elastically or plastically extensible.

33. Device according to claim 25, wherein the adhesion of the adhesive film strip is less than the cohesion, the adhesion is to a great extent dissipated when the film is extended, and the ratio of pulling-off force to tearing load is at least 1:2.0, the adhesive film strip being of the kind which is based on thermoplastic rubber and tackifying resins.

34. Device according to claim 25, wherein the rear side of the adhesive film strip is covered with a release laminate.

35. Device according to claim 25, wherein there is a hook on the front side of the plate.

36. Device according to claim 25, wherein the plate has on its rear side laterally alongside the adhesively attached adhesive film strip spacers, the height of which is less than the thickness of the adhesive film strip (5).

37. Device according to claim 36, wherein the spacers are located on both sides alongside the adhesively attached adhesive film strip.

38. Device according to claim 36, wherein the spacers are formed as fillets or segments.

39. Device according to claim 36, wherein the spacers are formed together with the plate as an injection-moulded part.

40. Device according to claim 36, wherein the height of the spacers is 30–90% of the thickness of the adhesively attached adhesive film strip.

41. Device according to claim 26, wherein the stripping fore at a pulling-off angle of 60° is no more than two times the stripping force at a peeling-off angle of 0°.

42. Device according to claim 27, wherein the striping fore at a pulling-off angle of 90° is no more than two times the stripping fore at a peeling-off angle of 0°.

43. Device according to claim 25, wherein the region which bears against the grip allows with respect to the adhesive film strip a stripping force at a pulling-off angle of 60° which is two times the stripping force at the pulling-off angle 0°.

44. Device according to claim 26, wherein the region which bears against the grip allows with respect to the adhesive film strip a stripping fore at a pulling-off angle of 90° which is two times the stripping fore at the pulling-off angle 0°.

45. Device according to claim 34, wherein the release laminate is a siliconized release paper on a release film.

46. Device according to claim 40, wherein the height of the spacers is 0.3–0.6 mm and the thickness of the adhesive film strip is 0.65 mm.

47. A method of forming a temporary bond between a substrate and a device according to any one of claims 43–64, said method comprising adhering said device to said substrate by means an adhesive bond formed between said substrate and said adhesive film strip, and thereafter releasing said device from said substrate by pulling on the grip of said adhesive film strip at an angle approximately perpendicular to the plane of the bond formed between said substrate and said adhesive film strip.

48. The method according to claim 47, wherein said device is released from said substrate by pulling on the grip of said adhesive film strip at an angle of 45°–135° relative to said bond plane.

49. A releasible, self-adhesive device comprising:
a) a plate having a front, a rear and four sides;
b) a double-side adhesive strip of film adhered to the rear of said plate through an adhesive bond in such a way that one end of said adhesive film strip protrudes from said plate as a grip; and
c) optionally one or more fasteners protruding from said plate for fastening said plate to another device; wherein
the adhesive bond between said adhesive film strip and said plate can be released by pulling and stretching the adhesive film strip; and
the plate has at its end which bears against the grip of said adhesive film strip or on its rear at least in a region which bears against the grip of said adhesive film strip a plastic surface, said plastic surface having a coefficient of friction or adhesion low enough that the adhesive film strip does not tear if the plate is pushed against the adhesive film strip while the adhesive film strip is being pulled and stretched.

50. A method of forming a temporary bond between a substrate and a device according to claim 49, said method comprising adhering said device to said substrate by means of an adhesive bond formed between said substrate and said adhesive film strip, and thereafter releasing said device from said substrate by pushing on said plate and pulling on the grip of said adhesive film strip.

* * * * *

UNITED STATES PATENT AND TRADEMARK OFFICE
CERTIFICATE OF CORRECTION

PATENT NO. : 6,737,135 B1
DATED : May 18, 2004
INVENTOR(S) : Luhmann et al.

It is certified that error appears in the above-identified patent and that said Letters Patent is hereby corrected as shown below:

Column 11,
Line 51, "stripping fore" should read -- stripping force --

Column 12,
Line 23, "fore at" should read -- force at --
Lines 24, 32 and 33, "stripping fore" should read -- stripping force --
Line 41, "claims 43-64" should read -- claims 25-46 --

Signed and Sealed this

Sixteenth Day of November, 2004

JON W. DUDAS
*Director of the United States Patent and Trademark Office*